(12) United States Patent
Urbahn et al.

(10) Patent No.: US 7,734,395 B2
(45) Date of Patent: Jun. 8, 2010

(54) SYSTEMS AND METHODS FOR REGULATING ELECTRICAL ADJUSTING MECHANISMS IN MOTOR VEHICLES

(75) Inventors: Jan Urbahn, Ramsey, NJ (US); Richard Baur, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 13 days.

(21) Appl. No.: 11/642,856

(22) Filed: Dec. 21, 2006

(65) Prior Publication Data

US 2007/0145921 A1 Jun. 28, 2007

Related U.S. Application Data

(63) Continuation of application No. PCT/EP2005/003784, filed on Apr. 11, 2005.

(30) Foreign Application Priority Data

Jun. 22, 2004 (DE) .................. 10 2004 030 055

(51) Int. Cl.
*B60R 22/00* (2006.01)
*E05F 15/00* (2006.01)
*G05D 3/00* (2006.01)

(52) U.S. Cl. .................. 701/45; 701/36; 701/39; 701/40; 701/42

(58) Field of Classification Search ............ 701/36, 701/39, 45, 49
See application file for complete search history.

(56) References Cited

U.S. PATENT DOCUMENTS

| | | | | |
|---|---|---|---|---|
| 4,894,646 A | * | 1/1990 | Ryman | 345/556 |
| 5,254,913 A | * | 10/1993 | Yang | 318/251 |
| 5,267,248 A | * | 11/1993 | Reyner | 714/736 |
| 6,390,529 B1 | * | 5/2002 | Bingle et al. | 296/76 |
| 6,427,115 B1 | * | 7/2002 | Sekiyama | 701/208 |
| 6,714,253 B2 | * | 3/2004 | Kim et al. | 348/556 |
| 6,725,960 B1 | | 4/2004 | Schonlau | |
| 2002/0074785 A1 | * | 6/2002 | Levine | 280/735 |
| 2004/0248543 A1 | * | 12/2004 | Itsukaichi | 455/345 |
| 2005/0197745 A1 | * | 9/2005 | Davis et al. | 701/1 |

FOREIGN PATENT DOCUMENTS

| | | |
|---|---|---|
| DE | 39 22 230 A1 | 1/1991 |
| DE | 44 04 594 A1 | 8/1995 |

(Continued)

OTHER PUBLICATIONS

International Search Report dated Jul. 29, 2005 with English translation (Four (4) Pages).

(Continued)

*Primary Examiner*—Khoi Tran
*Assistant Examiner*—Bhavesh V Amin
(74) *Attorney, Agent, or Firm*—Crowell & Moring LLP

(57) ABSTRACT

Driver-related electrical adjusting components in motor vehicles are regulated. An operator signal is generated based on a user actuating operator elements, to affect a desired movement of a vehicle component. The operator signal is processed in a control unit. An effect of the operator signal on movement of the vehicle component is regulated as a function of vehicle operating state signals so as to prevent the vehicle component from moving into a safety-critical position.

20 Claims, 2 Drawing Sheets

FOREIGN PATENT DOCUMENTS

| | | |
|---|---|---|
| DE | 195 22 897 A1 | 1/1997 |
| DE | 299 16 000 U1 | 1/2000 |
| DE | 199 47 500 A1 | 5/2001 |
| DE | 10138 481 A1 | 2/2003 |
| DE | 101 44 752 A1 | 3/2003 |
| DE | 202 19 882 U1 | 4/2003 |
| JP | 11115602 A * | 10/1997 |

OTHER PUBLICATIONS

German Search Report dated Feb. 21, 2005 with English translation of relevant portion (Eight (8) Pages).

* cited by examiner

SYSTEMS AND METHODS FOR REGULATING ELECTRICAL ADJUSTING MECHANISMS IN MOTOR VEHICLES

CROSS REFERENCE TO RELATED APPLICATIONS

This application is a continuation of PCT International Application No. PCT/EP2005/003784, filed Apr. 11, 2005, which claims priority under 35 U.S.C. §119 to German Patent Application No. 10 2004 030 055.0, filed Jun. 22, 2004, the entire disclosures of which are herein expressly incorporated by reference.

BACKGROUND AND SUMMARY OF THE INVENTION

The present invention relates generally to motor vehicle control systems and, more particularly, to regulating driver-related electrical adjusting mechanisms in motor vehicles.

Driver-related electrical adjusting mechanisms, for example for motor vehicle seats or motor vehicle steering wheels, are provided in modern motor vehicles to enhance the comfort of the user. Such an electrical adjusting mechanism for a motor vehicle seat is disclosed in DE 195 22 897 C1.

A driver-related electrical adjusting mechanism typically comprises drive elements for the mechanical movement of a motor vehicle component (e.g., a motor vehicle seat or a motor vehicle steering wheel). It also typically comprises operating elements (e.g., switches or multi-functional operating units), which are actuated by the user for the purpose of pre-selecting a desired movement. In addition, an adjusting mechanism usually includes a control unit, in which electrical input signals are converted into actuating signals. One subgroup of the input signals of the control unit may be influenced by the user by actuating the input elements and, therefore, delivers to the control unit information about the actuated inputs. Such input signals are referred to below as operator signals. The drive elements are driven by the actuating signals, which are emitted by the control unit.

The comfort of the user of a motor vehicle is enhanced by a driver-related electrical adjusting mechanism. This enhancement conflicts with the safety risks, which may be generated by hardware defects as well as by improper or inadvertent actuation of the operating elements. For example, in the absence of additional safety measures, a single hardware defect (e.g., decrease or saturation of a voltage level as a consequence of a hardware defect), an erroneous input into a multi-functional operating unit or a jammed switch may result in a motor vehicle seat being moved into a precarious or even unsafe seat position. The seat could, for instance, be moved into a position in which the driver of the motor vehicle can no longer actuate or can actuate only to a limited degree the pedals of the motor vehicle, in particular the brake pedal. Similarly, in the absence of additional safety measures, a motor vehicle component may be moved into a position, in which the function of specific passive safety devices for the protection of the vehicle occupants is not guaranteed. That is, the component may be moved into a position in which these safety devices do not unfold their total effect or they in turn constitute a safety risk (e.g., due to the modified seat position, the minimum distance from the airbag is not achieved).

Current systems do not provide adequate safety measures for the prevention of such safety risks. For example, it is customary to provide in the operating instructions of the motor vehicle or on the operating elements themselves a warning that any actuation of the operating elements while the vehicle is in motion is prohibited. However, such a safety measure that is not implemented in the hardware configuration exhibits the drawback that it can be easily ignored or consciously disregarded by the user of the motor vehicle.

Current systems lack any hardware-implemented safety measures, which preclude the safety-critical movement of a driver-related motor vehicle component, which can be electrically adjusted.

An aspect of the invention is to provide a method for regulating a driver-related electrical adjusting mechanism, by which the operability of the adjusting mechanism is limited in such a way that the movements of the driver-related, adjustable motor vehicle component into a safety-critical position are prevented.

The present invention provides control methods and systems, in which the effect of the operator signals on the actuating signals, leading to the movement of the motor vehicle component, is limited as a function of the operating states of the vehicle. One advantage of the invention lies in the ability to prevent any movement of the motor vehicle component into a safety-critical position by means of such a method both in the case of an improper actuation of the operating elements and in the case of hardware defects in the input elements or the feed lines of the control unit. The present invention also largely preserves for the user the comfort, offered by the driver-related electrical adjusting mechanism, by limiting the movement of the driver-related, adjustable motor vehicle component only to the extent that such a curtailment is necessary from a safety viewpoint.

In one implementation of the present invention, the vehicle speed is regarded as one of the operating states of the motor vehicle. This consideration may be effected, for example, by decreasing monotonically (i.e., under otherwise identical conditions) the effect of the operator signals as the speed of the vehicle increases.

A first embodiment of the invention prevents the motor vehicle component from moving into a safety-critical position by limiting the movement of the motor vehicle component to a defined time interval after the point in time of the last substantial modification of the operator signals. This enables the user to make—for the sake of comfort—a slight adjustment in the position of the motor vehicle component by actuating for a short period of time the operating elements; whereas if an operating element gets stuck or a comparable hardware defect arises, the result is merely a limited movement and, therefore, a non-safety critical movement of the component of the motor vehicle.

Another embodiment of the invention involves limiting the speed of the movement of the motor vehicle component to a defined maximum speed. This prevents the user from being surprised by movements of the motor vehicle component into a safety-critical position as a consequence of an inadvertent or improper actuation of the operating elements or a hardware fault. Thus, in the case of an inadvertent actuation of the operating elements, the user has sufficient reaction time to terminate the adjusting movement or to initiate a movement in the opposite direction. In the case of a hardware defect, this type of curtailment offers the advantage that the user has sufficient time to react to the driving conditions that are changing unintentionally, for example to adjust his seat position on the motor vehicle seat to a changing seat position, and/or to induce a safer stoppage of the vehicle.

A third embodiment of the invention prevents movements of the motor vehicle component into a safety-critical position by limiting the amount of movement of the motor vehicle component to a reduced value range. The reduced value range is less than or equal to the mechanically possible value range for the amount of movement of the motor vehicle component. Thus, there is still the possibility of making a fine adjustment on a small scale for the purpose of the comfort of the user. In contrast, an inadvertent or abnormal adjustment on a larger scale and, thus, perhaps on a safety-critical scale is eliminated.

In the aforementioned embodiments—with a suitable choice of control parameters—the user may bring about a perceptible movement of the driver-related, adjustable motor vehicle component in all positions of the motor vehicle component and in all operating states of the motor vehicle by actuating an operating element, e.g., by depressing a button. Therefore, should the motor vehicle component fail to move, the user is not confused or perhaps diverted from the driving actions.

In yet another embodiment of the present invention, which can be combined with all of the above described embodiments, feedback is provided to the user. The feedback may be in response or a reaction to an actuation of the input elements, the effect of which is limited by the control system, and may signal to the user the presence of the limitation. This feedback may have a visual, auditory or haptic effect on the user. To trigger such feedback, the control unit emits signals that are referred to below as indicating signals. Hence, if the component of the motor vehicle fails to move or, contrary to the user's expectations, moves slightly, the user is not confused or possibly diverted from the driving actions.

Such feedback may also be provided in those positions of the motor vehicle component and in those operating states in which only specific actions of the operator result in a perceptible movement of the motor vehicle component. For example, feedback may be provided at the cutoff points of the mechanically possible value range or at the cutoff points of the value range that is reduced by the automatic control hardware. As an alternative, in the event that the ability to make an adjustment is reduced by the control hardware to the actuation of selected operating elements, the criteria for the regulating procedure may be slightly modified. Such modification may effect a perceptible movement of the motor vehicle component in the event of an arbitrary actuation of an operating element and/or in as many cases as possible of the actuation of an operating element.

Other objects, advantages and novel features of the present invention will become apparent from the following detailed description of the invention when considered in conjunction with the accompanying drawings.

BRIEF DESCRIPTION OF THE DRAWINGS

The invention is explained in detail below with reference to the attached drawings. In the drawings.

DETAILED DESCRIPTION OF THE DRAWINGS

The following description refers to the accompanying drawing. The implementations set forth in the following description do not represent all implementations consistent with the claimed invention. Instead, they are merely some examples of implementations consistent with the invention. Other implementations may be used and structural and procedural changes may be made without departing from the scope of present invention.

Figure 1:
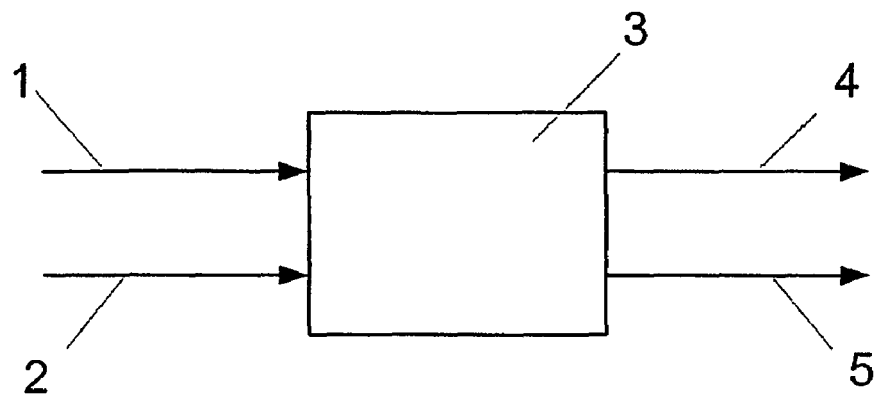
FIG. 1 is a schematic sketch of an interconnection of a control unit in an electrical adjusting mechanism for a motor vehicle seat.

FIG. 1 is a schematic sketch of the interconnection of a control unit in an electrical adjusting mechanism for a motor vehicle seat. The input signals, which are processed in the control unit 3, consist of two signal vectors 1, 2. The first signal vector 1 is formed by the operator signals, which are generated or modified by the user by actuating the input elements. The second signal vector 2 contains information about the operating states of the motor vehicle. The operating states are referred to below as the vehicle state signals. The operator signals 1 and the vehicle state signals 2 are converted in the control unit 3 into actuating signals 4, by means of which the drive elements of the adjusting mechanism are driven. Due to the control method implemented in this conversion, the ability to adjust the position of the seat is limited in various ways (to be explained in detail below) so that the seat of the motor vehicle is not moved into a safety-critical position in the current operating state of the motor vehicle. In such a control method, the effect of the operator signals 1 on the actuating signals 4 and, thus, on the movement of the motor vehicle seat is limited as a function of the vehicle state signals 2.

Figure 2:
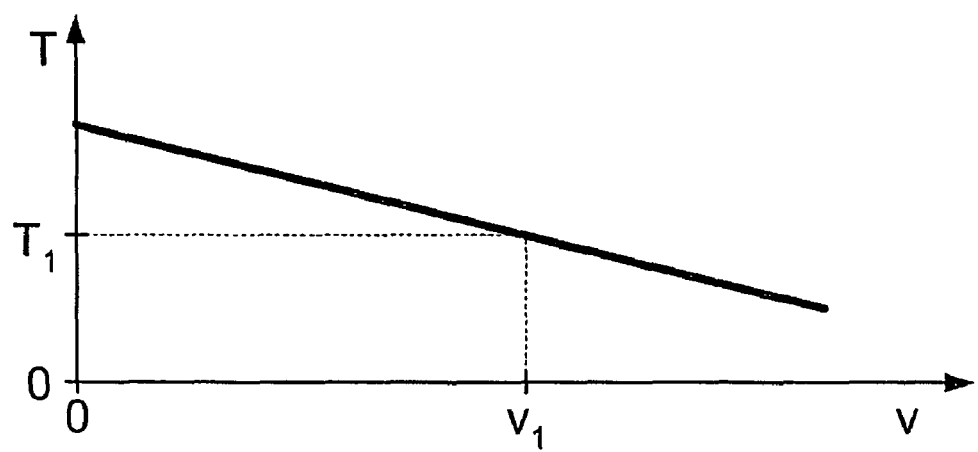
FIG. 2 depicts an exemplary correlation between the vehicle state signals, here the vehicle speed, and a defined time interval, which is provided in a method for regulating the electrical adjustment of the seat.

FIG. 2 depicts, as an example, one possible correlation between the vehicle state signals 2 and a limiting time interval that is provided in the method for regulating the electrical seat adjustment. In the present preferred embodiment, information regarding the vehicle speed is made available to the control unit 3 as an input signal, contained in the vehicle state signals 2. This information is processed in the control unit 3 and taken into consideration when curtailing the effect of the operator's signals on a movement of the motor vehicle seat. In the present example, the time interval T decreases strictly monotonically as the vehicle speed v increases. Similarly, embodiments in which T is changed by the voltage of the various terminals in the motor vehicle and/or by exceeding/falling below various threshold limits of the vehicle speed v are also conceivable. In many embodiments, T decreases monotonically as the vehicle speed v increases.

With the control hardware, it is possible to curtail, according to this embodiment of the invention, the ability to make adjustments by means of the procedure described below.

Assume that the operator signals 1 are modified in essence only if the operating elements for adjusting the seat are actuated. Such modifications of the operator signals 1 are detected by the control unit 3 and trigger in said control unit the start of a timer. The time interval T, during which the timer remains active after such a start, is established, according to a correlation—for example, the correlation shown in FIG. 2—which is stored in the control unit 3, as a function of the vehicle state signals 2. The control system is designed in such a manner that a transfer behavior between the operator signals 1 and the actuating signals 4 is guaranteed only if the timer is active, the transfer behavior being provided for optimal operability of the adjusting mechanism. If the timer has run down, the transfer behavior is modified in such a manner that the motor vehicle seat can no longer move.

If at a vehicle speed $v_1$ the user of the motor vehicle actuates the electrical seat adjustment by moving a slide switch and terminates again the operator's action after a time interval $T_{1a}$, which is less than $T_1$, then the effect of the operator's actions is not limited at all by the control hardware. If, in contrast, the operator's action lasts longer than a time interval $T_{1b}$, which is greater than $T_1$, for example by holding the slide switch, then the movement of the motor vehicle seat is terminated after the time interval $T_1$. However, thereafter a new movement may be initiated by a new action of the operator, by means of which the timer in the control unit 3 is re-started.

In the present embodiment, the time interval $T_1$ is established as a function of the vehicle speed $v_1$ that was valid at the last substantial modification of the operator signals 1. As a further development of the inventive idea, the time interval $T_1$ may be modified, while the timer is running, by also considering the vehicle speed as a function of time.

Figure 3:
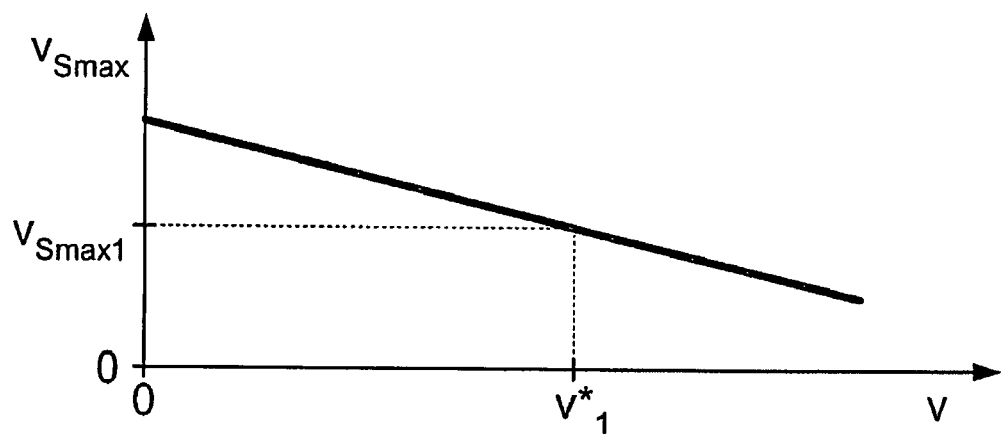
FIG. 3 depicts an exemplary correlation between the vehicle state signals, here the vehicle speed, and a maximum speed of the movement of the motor vehicle seat, said speed being provided in a control method.

FIG. 3 depicts, as an example, one possible correlation between the vehicle state signals 2 and a maximum speed of the movement of the motor vehicle seat, the speed being provided in the method for regulating the electrical seat adjustment. In this embodiment, the control unit 3 also processes the vehicle speed v as an input signal, contained in the vehicle state signals 2. In a first step, a maximum speed $v_{Smax}$ for the movement of the seat of the motor vehicle is determined from v in accordance with a correlation, which may be stored in the control unit 3. Correspondingly, $v_{Smax}$ is defined as the amount of one or more translatory or rotary movement speeds of the entire seat of the motor vehicle or single components of the seat. In the present example, $v_{Smax}$ decreases strictly monotonically as the vehicle speed v increases. As an alternative, $v_{Smax}$ may be modified by means of the voltage of various terminals in the motor vehicle and/or by exceeding/falling below various thresholds of the vehicle speed v. Generally, $v_{Smax}$ will decrease monotonically as the vehicle speed v increases.

The adjustability may be limited, according to this embodiment of the invention, with the control hardware by means of the following procedure. The control system is designed in such a manner that a transfer behavior between the operator signals 1 and the actuating signals 4 is provided, the transfer behavior being provided for optimal operability of the adjusting mechanism. If at this stage, the control system computes actuating signals 4, which would result in the movement of the motor vehicle seat $v_S$ and this movement is greater than $v_{Smax}$, then the actuating signals are modified to the effect that the result of these actuating signals is a movement of the motor vehicle seat, the speed of which is approximately the amount $v_{Smax}$. The value $v_{Smax}$ may be established once at the start of an operator's action or may be adjusted continuously to the current vehicle speed.

If at this stage, the user actuates the electrical seat adjustment at a vehicle speed $v^*_1$, the user has all of the usual adjustment options. The behavior of the adjusting mechanism is modified by the control system only to the effect that no movement of the motor vehicle seat exceeds the maximum speed $v_{Smax}$, adjusted to the current vehicle speed.

Figure 4:
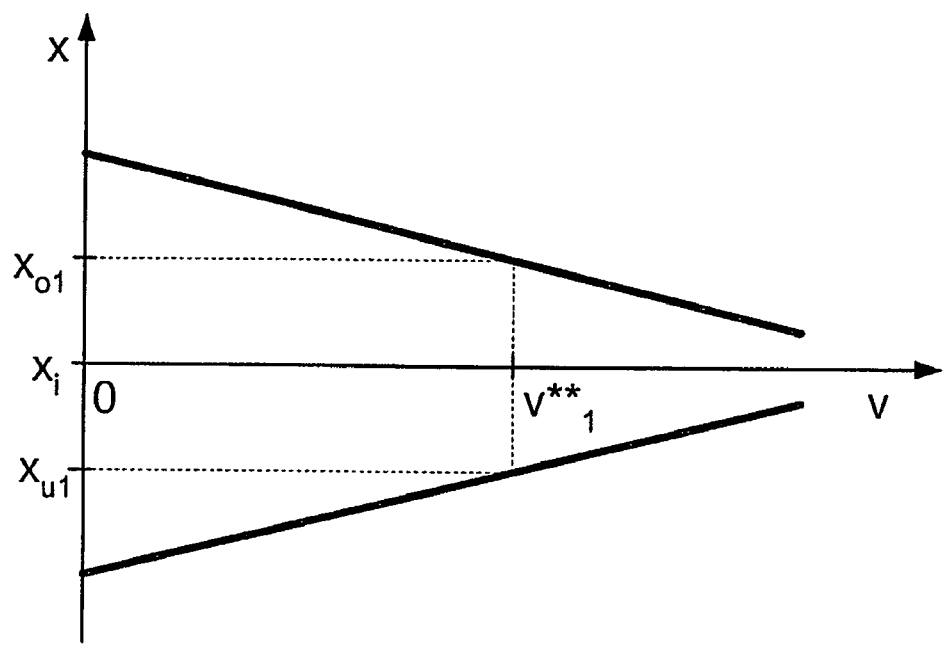
FIG. 4 depicts an exemplary correlation between the vehicle state signals, here the vehicle speed, and a reduced value range for the electrical adjustability of a motor vehicle seat, said speed being provided in a control method.

FIG. 4 depicts, as an example, one possible correlation between the vehicle state signals 2 and a reduced value range, which is provided in a control method according to another preferred embodiment and belongs to the seat positions of a motor vehicle seat. As in the above examples, a control unit 3 processes the vehicle speed v as an input signal, contained in the vehicle state signals 2. According to a correlation, stored in the control unit 3, a value range of allowable seat positions $[x_u, x_o]$ is derived from v and a seat position $x_i$, fixed at an initialization time. The variable x describes one or more translatory or rotary quantities, contributing to the seat position. In the present example, the amount $x_o-x_u$ of the value range, reduced by the control system, decreases strictly monotonically as the vehicle speed v increases. As an alternative, the value range $[x_u, x_o]$ may be modified by means of the voltage of various terminals in the motor vehicle and/or by exceeding/falling below various thresholds of the vehicle speed v. Generally, the amount of the value range $x_o-x_u$ will decrease monotonically as the vehicle speed v increases.

The adjustability may be limited, according to this embodiment of the invention, with the control hardware by means of the following procedure. The control system is designed in such a manner that a transfer behavior between the operator's signals 1 and the actuating signals 4 is provided, only if the current seat position x is in the value range $[x_u, x_o]$, said transfer behavior being provided for optimal operability of the adjusting mechanism. The seat position x may be recorded continuously by means of measurement technology and/or determined from the past output signals. If a cutoff point of the value range is reached, the transfer behavior is modified in such a manner that it is not possible for the motor vehicle seat to move outside the range of values.

The value range $[x_u, x_o]$ includes the seat position $x_i$ at an initialization time $T_i$. The initialization time $T_i$, at which $x_i$ is established, may be selected as the time at which the battery voltage is applied to a vehicle terminal, the time at which the motor starts, the time at which a relative or absolute vehicle speed threshold is exceeded or is not reached or the time at which a time interval expires. The upper and bottom cutoff points of the value range $[x_u, x_o]$ are established either with the aid of the operating states of the motor vehicle at the last instant of initialization or at the start of an operator's action. Or they may be adjusted continuously to the current operating states of the motor vehicle. To this end, the vehicle state signals 2 are evaluated in the control unit 3.

In one embodiment, exceeding the vehicle speed threshold of 1 km/h is chosen as the first instant of initialization. Other initialization times are added if during the trip the seat position was not modified in a time interval of one minute. At each instant of initialization, the current seat position is stored as $x_i$ in the control unit 3. The value range $[x_u, x_o]$ is adapted continuously to the current vehicle speed v.

Consistent with the present invention, the regulating method may be expanded by limiting the value range $[x_u, x_o]$ to seat positions, in which specific devices for protecting the vehicle occupants may unfold/provide their total effect or in turn may not constitute a safety risk. For example, it may be ensured with the choice of the range of values that the distance of a vehicle occupant from an airbag does not drop below the minimum value. Therefore, in this respect it is especially advantageous if the control unit 3 for establishing the range of values has not only data about the operator signals and the vehicle state signals but also data about the vehicle occupants (e.g., weight, seat position, eye height). Such data are referred to below as the vehicle occupant parameters.

If, as the result of a modification of the value range $[x_u, x_o]$, the current seat position x is outside the value range $[x_u, x_o]$, the transfer behavior of the control system is changed in such a way that a movement of the motor vehicle seat is possible only in the direction of a reduction in the distance from the current value range $[x_u, x_o]$. As an alternative to this procedure, if there is a control unit 3, which is provided with means for interpreting the movement of the motor vehicle seat as a function of time, it can be checked, according to the safety-related criteria, whether the motor vehicle seat has moved outside the range of values and whether a continuation of the movement would constitute a safety risk. If, for example, the outcome of this check is negative, the range of values may be re-initialized.

If at this stage, the user actuates the electrical seat adjustment at a vehicle speed $v^{}_1$, in most cases the user has from a qualitative viewpoint the usual adjustment options. The behavior/operability of the adjusting mechanism is curtailed by the control system only to the effect that the amount of movement of the motor vehicle seat is limited to a reduced value range $[x_{u1}, x_{o1}]$, which is less than or equal to the mechanical value range for the amount of movement of the seat. A number of the alternatives used to select the initialization time do, in fact, lead at any time to a reduction in the value range of the seat adjustment for safety reasons. But in the course of a prolonged trip, during which the control unit 3** is re-initialized once or multiple times, it is quite possible for the user to make an adjustment over the entire value range of mechanical adjustability.

For ease of explanation, the seat position x and the movement speed $v_S$ of the motor vehicle seat are treated as scalar quantities in the aforementioned examples. However, the inventive idea includes an extension of the proposed considerations to multi-dimensional seat position and movement vectors as well as the application of selected components of multi-dimensional seat position and movement vectors.

The above-described embodiments of the invention are suitable for preventing safety-critical movements of a motor vehicle seat as a consequence of an improper or inadvertent actuation of the operating units of an adjustment mechanism or as a consequence of a hardware defect in an operating unit or the feed lines of the control unit 3. It is conceivable that one possible negative effect of some of the described procedures is that the user of a motor vehicle is confused by the modified behavior of the adjusting mechanism. For example, the user could think that there is a defect in the hardware, instead of a curtailment produced by the control hardware. The ensuing search for the fault or a repeated test of the adjustability could divert the user from the driving actions. The risk of such a reaction of the user may be reduced by various measures.

On the one hand, as a reaction to an actuation of the input elements, the effect of which is curtailed by the control system, the user may receive feedback that signals him that the curtailment exists. This feedback may have a visual, auditory or haptic effect on the user. For example, in response to an actuation of an input element, the effect of which is curtailed by the control system, visual feedback in the form of a lighting up of a switching or indicating element may be sent to the user. Similarly, the user may receive auditory feedback in the form of an acoustic output, e.g., a signal tone or voice output by means of an acoustic output unit. In addition, as the reaction to an actuation of the input elements, the effect of which is limited by the control hardware, the user may receive haptic feedback in the form of a change in the mechanical resistance of the actuated operating element, in the form of a mechanical vibration of the actuated operating element, or some other form of representation that can be perceived by the cutaneous senses. To trigger the respective feedback to the user, the control unit 3 emits indicating signals 5.

Feedback may also be provided for seat positions and operating states, in which only selected actions of the operator will result in a perceptible movement of the motor vehicle seat—for example, at the cutoff points of a value range that is reduced mechanically or by means of the control hardware. As an alternative, the described control method may be slightly modified to the effect that, irrespective of the vehicle state, any actuation of an operating element and/or—in the maximum number of vehicle states—as many variants of an actuation of an operating element as possible produces a perceptible movement of the motor vehicle seat, the amount of which, however, is so slight that it does not cause or enhance any safety risks.

In addition to the isolated application of the measures and methods for regulating the adjusting mechanism and feedback to the user, the present invention also contemplates the combination of several measures and methods.

In the above description of the invention, the control unit 3 is presented simply as a single component. When the present invention is implemented with hardware, the function of the control unit 3 may be assumed correspondingly by a single device. As an alternative, it may be advantageous in terms of an optimal implementation of an inventive method for different vehicle models and seat models, if a pre-processing unit, which can be used for all possible vehicle models and seat models, is connected upstream of the motor vehicle seat control unit, which has been adapted to the vehicle model and the seat model. In such a case, methods consistent with the present invention for limiting the movement of the motor vehicle seat are carried out essentially in the pre-processing unit, from which the modified input signals and/or limiting parameters are emitted to the motor vehicle seat control unit. The present invention contemplates both of the above-described hardware-related implementation variants.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regulating a motor vehicle adjusting mechanism for a vehicle component, comprising:
   receiving an occupant-initiated signal that is generated during movement of the motor vehicle when an operating element of the adjusting mechanism is activated to cause movement within a vehicle passenger compartment and associated with the adjusting mechanism; and
   processing the occupant-initiated signal in a control unit to reduce or prevent movement of the vehicle component initiated by a vehicle occupant into a safety critical position only during the movement of the motor vehicle upon occurrence of one of expiration of a time interval defined as a function of vehicle speed and beginning with a previous modification of the occupant-initiated signal, exceeding of a maximum vehicle component speed determined as a function of vehicle speed, and exceeding of a vehicle component movement range which is less than a full range of vehicle component motion determined as a function of vehicle speed.

2. The method of claim 1, wherein the processing comprises:
   making a movement of the vehicle component perceptible to the vehicle occupant.

3. The method of claim 1, wherein the processing comprises:
   regulating strength of the occupant-initiated signal on movement of the vehicle component also as a function of vehicle occupant parameters so as to maintain a function of motor vehicle passive safety devices.

4. The method of claim 1, wherein the previous modification is a previous actuation of the operating element.

5. The method of claim 4, wherein the time interval is decreased monotonically as vehicle speed increases.

6. The method of claim 1, wherein a speed of the vehicle component movement is limited to a defined maximum speed.

7. The method of claim 6, wherein a maximum movement speed of the vehicle component is decreased monotonically as vehicle speed increases.

8. The method of claim 1, wherein the processing comprises:
limiting the movement of the vehicle component to a reduced range of movement that is less than a full range of movement of the vehicle component.

9. The method of claim 8, wherein the reduced range includes a position of the vehicle component at an initialization time.

10. The method of claim 9, wherein the initialization time includes at least one of:
a time at which a battery voltage is applied to a vehicle terminal;
a time at which a motor of the motor vehicle starts;
a time at which a relative or absolute vehicle speed threshold is exceeded;
a time at which a relative or absolute vehicle speed threshold is not reached; and
a time at which a time interval expires.

11. The method of claim 8, wherein the reduced range is decreased monotonically as vehicle speed increases.

12. The method of claim 1, further comprising:
providing occupant feedback in response to an actuation of the operating element.

13. A control system for regulating an adjusting mechanism for a vehicle component in a motor vehicle, comprising:
an input for receiving an occupant-initiated signal, wherein the signal is generated during movement of the motor vehicle when an operator element of the adjusting mechanism is activated to cause a desired movement of the vehicle component located within a vehicle passenger compartment area associated with the adjusting mechanism; and
a module that processes the signal for regulating behavior of the adjusting mechanism so as to prevent or reduce the desired movement of the vehicle component initiated by the vehicle occupant into a safety-critical position only during movement of the motor vehicle upon occurrence of one of expiration of a time interval defined as a function of vehicle speed and beginning with a previous modification of the occupant-initiated signal, exceeding of a maximum vehicle component speed determined as a function of vehicle speed, and exceeding of a vehicle component movement range which is less than a full range of vehicle component motion determined as a function of vehicle speed.

14. The system of claim 13, wherein the processing module allows a movement of the vehicle component that is perceptible to the occupant.

15. The system of claim 13, wherein the processing module regulates strength of the occupant-initiated signal on movement of the vehicle component also as a function of occupant parameters so as to maintain a function of motor vehicle passive safety devices.

16. The system of claim 13, wherein the previous modification is a previous actuation of the operating element.

17. The system of claim 13, wherein the module limits a speed of the vehicle component movement.

18. The system of claim 13, wherein the module limits the movement of the vehicle component to a reduced range of movement that is less than a full range of movement of the vehicle component.

19. The system of claim 13, wherein the processing module provides feedback to the occupant as a reaction to an actuation of the operator element.

20. A regulating system in a motor vehicle, comprising:
an electrical adjusting mechanism for adjusting a vehicle component located within a passenger compartment and having an associated operator element; and
a control unit comprising:
an input for receiving a signal that is generated when a vehicle occupant actuates the operator element to cause a desired movement of the vehicle component; and
logic for regulating the adjusting mechanism so as to reduce or prevent the desired movement initiated by the vehicle occupant into a safety-critical position only during movement of the motor vehicle upon occurrence of one of expiration of a time interval defined as a function of vehicle speed and beginning with a previous modification of the occupant-initiated signal, exceeding of a maximum vehicle component speed determined as a function of vehicle speed being exceeded, and exceeding of a vehicle component movement range less than a full range of vehicle component motion determined as a function of vehicle speed.

* * * * *